United States Patent [19]

Cooper

[11] 4,042,058
[45] Aug. 16, 1977

[54] EASILY ACCESSIBLE SWITCHES FOR MANUAL CONTROL OF AN AUTOMATICALLY CONTROLLED VEHICLE

[75] Inventor: Jack A. Cooper, Grand Rapids, Mich.

[73] Assignee: Lear Siegler, Inc., Santa Monica, Calif.

[21] Appl. No.: 641,989

[22] Filed: Dec. 18, 1975

[51] Int. Cl.² .............................................. B60K 26/02
[52] U.S. Cl. ................................... 180/98; 200/61.44
[58] Field of Search ................... 180/82 R, 91, 96, 98, 180/19 R, 2, 19 S, 19 H; 200/159 B, 61.44, 294, 296, 86 R, 333, 61.82, 52 R; 104/148 R, 149, 88, 53 R; 318/280, 282, 256, 264, 446

[56] References Cited

U.S. PATENT DOCUMENTS

| | | | |
|---|---|---|---|
| 2,772,113 | 11/1956 | Berard | 180/65 R X |
| 2,902,105 | 9/1959 | Wiley et al. | 180/91 |
| 3,139,994 | 7/1964 | Chasar | 214/16.4 |
| 3,381,456 | 5/1968 | Taylor | 180/2 |
| 3,472,333 | 10/1969 | Lowenstern, Jr. | 180/98 |
| 3,496,317 | 2/1970 | Reed | 200/52 R |
| 3,560,922 | 2/1971 | Wilson | 180/96 |
| 3,812,929 | 5/1974 | Farque | 180/82 R |
| 3,890,903 | 6/1975 | Showell | 318/264 |
| 3,891,043 | 6/1975 | Valdex | 180/19 R X |
| 3,957,322 | 5/1976 | Mastronardi | 104/88 |

FOREIGN PATENT DOCUMENTS

| | | | |
|---|---|---|---|
| 1,273,397 | 9/1961 | France | 180/91 |
| 2,125,199 | 2/1971 | France | 180/91 |
| 1,168,441 | 10/1969 | United Kingdom | 200/159 B |

Primary Examiner—Joseph F. Peters, Jr.
Assistant Examiner—J. D. Rubenstein
Attorney, Agent, or Firm—McGarry & Waters

[57] ABSTRACT

A vehicle which is automatically driven along a predetermined guide path has easily accessible manually operated switches for arresting the movement of and for restarting the vehicle. The switches have elongated switch elements which extend along the sides of the vehicles. The elongated switch for restarting the vehicle is recessed with respect to the switch that arrests the movement of the vehicle.

7 Claims, 4 Drawing Figures

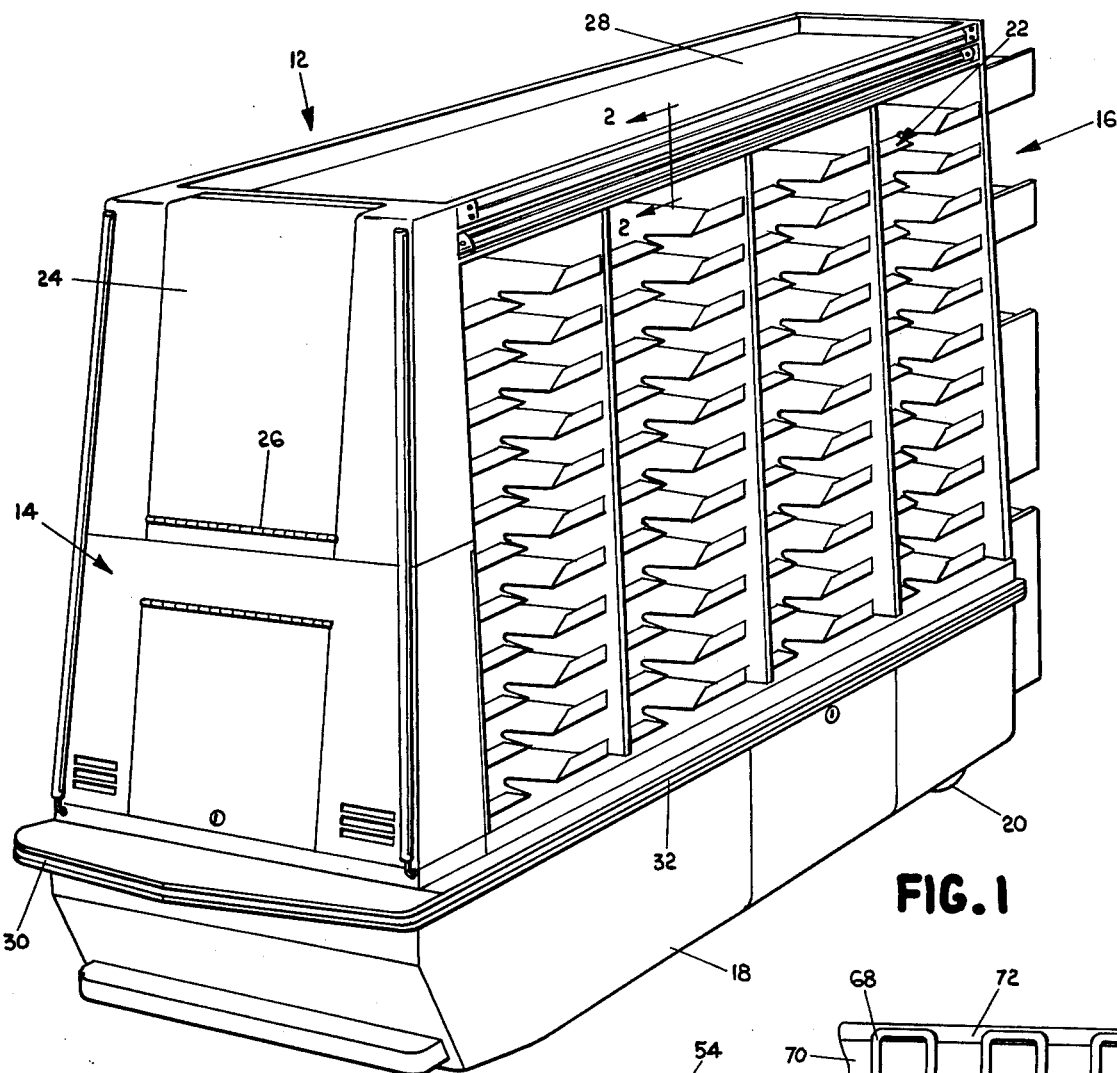
FIG. 1
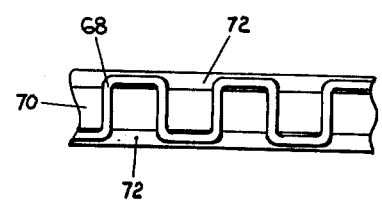
FIG. 4
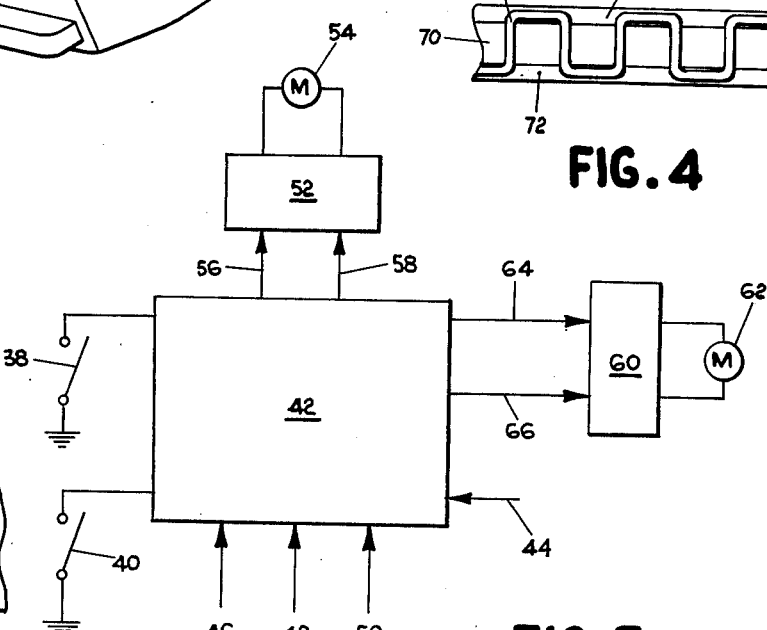
FIG. 2
FIG. 3

EASILY ACCESSIBLE SWITCHES FOR MANUAL CONTROL OF AN AUTOMATICALLY CONTROLLED VEHICLE

BACKGROUND OF THE INVENTION

1. Field of the Invention

This invention relates to a manual restart and stop control in the form of elongated switches for manually stopping and restarting automatically controlled vehicles.

2. State of the Prior Art

Various service vehicles have been provided with automatic control so that they are driven on a predetermined guide path in a programmed manner. In such vehicles, the guide paths, such as reflected guide lines or electrically detectable guide wires, are positioned on or in the floor. For example, in U.S. Pat. No. 3,628,624 to Wesener, issued Dec. 23, 1971, a vehicle which follows a predetermined guide path has a control panel at the front end of the vehicle for presetting the reader to respond to code markings along the guide path.

An automatically controlled vehicle with a manual override is disclosed in the U.S. Pat. No. 3,557,893, to Kohls, issued Jan. 26, 1971. In the Kohls vehicle, the manual override is a tiller which deactivates the automatic steering control, and automatic drive motor upon movement of the tiller from a vertical inoperative position to a horizontal operative position.

Automatic guidance systems for vehicles have been made to detect, track, and follow sensible lines marked on a floor surface. Further, guidance systems for vehicles have included sensors to detect coded signals marked on the floor surface for temporarily stopping the vehicle's progress for a given amount of time, after which the vehicle restarts and continues to follow the predetermined path.

At programmed stops, the vehicle stops for a given length of time. For example, in a mail delivery vehicle, the vehicle will stop at given locations in order to permit mail to be removed at the locations. The vehicle will remain at the location a sufficient time to permit removal of the mail or other articles aboard the vehicle. Normally, at the end of the stop period, an audible or visual signal will indicate that the vehicle is about to commence movement again along the preselected path.

Occasionally, the programmed stop may be insufficient to allow all mail or other articles to be removed from the vehicle. Therefore, it is desirable to maintain the vehicle at the station for a longer period of time. At other times, it may be desirable to stop the normal movement of the vehicle along the preselected path where no temporary stop is programmed to remove articles, for example. It is therefore desirable to have readily accessible switches to arrest the movement or to delay restarting of the vehicle at certain times. Such vehicles have heretofore been provided with front bumpers which have pressure sensitive switches incorporated therein. However, such bumpers are generally inadequate to stop the vehicle from the side under conditions where a stop switch must be activated in an emergency or quick action situation. Under such conditions, the act of locating and activating a switch may be quite difficult to do in the minimum amount of time allowed. Therefore, such a switch must not only be readily accessible but must be readily identifiable.

Vehicles which have emergency stop switches must also have a means to restart the vehicle or to recommence the programmed operation. In conventional types of start and stop controls, switches to perform such functions are frequently placed adjacent to one another. However, such positioning may result in the start switch being activated when the stop switch is desired in emergency types of situations. Thus, any start switches should be readily distinguishable from stop switches and should be positioned such that the start switch is not accidentally struck when the stop switch is desired.

SUMMARY OF THE INVENTION

The invention comprises an automatically controlled vehicle with at least one elongated switch element extending along the exterior of the vehicle, preferably extending horizontally along the upper portion of each side of the vehicle for stopping the automatic vehicle and for overriding the automatic control for the vehicle. The elongated switch element extends substantially along the length of at least one side of the vehicle. The switch element is preferably slightly protruded from the vehicle's side. The elongated switch element provides easy and quick means to manually arrest the vehicle's movement or to delay restarting thereof. The switch element is easily detectable and easily operable for quick stopping of the vehicle when necessary. A second switch is provided to restart the vehicle along its path. The actuation of the second switch generates a go signal that overrides any temporary programmed stop signal controlling the vehicle. Preferably, the second switch is an elongated switch element placed just below and in a slightly recessed position in the side panel of the vehicle with respect to the first elongated switch element so that the accidental striking of the second switch for the first switch is avoided or minimized. The invention provides an easily accessible means to arrest the automatic vehicle's movement along its predetermined path and another means that immediately recommences the vehicle's movement when arrested by the former means or by a temporary stop signal. In a preferred embodiment of the invention, the first switch element is red and the second elongated switch element is green so that the function of the switches is readily identifiable.

BRIEF DESCRIPTION OF THE DRAWINGS

The invention will now be described with reference to the accompanying drawings in which:

FIG. 1 is a perspective view of an automatically controlled vehicle with control switches according to the invention;

FIG. 2 is an enlarged cross-sectional view taken along line 2—3 in FIG. 1;

FIG. 3 is a schematic view of the control switches and their connection to the automatic program that controls the vehicle; and FIG. 4 is an enlarged broken-away view of an elongated switch.

DETAILED DESCRIPTION OF THE PREFERRED EMBODIMENT

Referring now to the drawings, and to FIG. 1, in particular, there is shown an automatically controlled vehicle 12 for delivery mail, for example. The vehicle has a front end 14, a back end 16 and sides 18. Rear wheels 20 and a single steerable and driven wheel (not shown) at the front of the vehicle, support the vehicle for movement along a surface. The vehicle has a plurality of mail shelves 22 in which various items may be placed for delivery by the vehicle.

Normally, the vehicle will track an invisible line, and has a such as a fluorescent material containing line, and has a tracking system which is disclosed and claimed in commonly assigned copending U.S. patent application of Jack A. Cooper and Carl DeBruine, Ser. No. 489,043, filed July 16, 1974, and entitled VEHICLE CONTROL MECHANISM. To this end a tracking unit (not shown) is provided beneath the vehicle for tracking the invisible line and for automatically guiding the direction of the vehicle. The tracking unit also detects control signals to control the stopping of the vehicle. The vehicle thus normally follows a predetermined path automatically and is programmed to stop for timed intervals at preselected locations. After the timed stops, the vehicle will then continue along the preselected path until it comes to another stopping place.

Occasionally, it is desirable to disengage the automatic control so that the vehicle can be operated manually, particularly when the vehicle needs to be quickly stopped or restarted. For example, if someone has not completed removing mail from the shelves and the vehicle starts or is about to start moving, it is desirable to arrest the vehicle's movement quickly. For this purpose, two elongated strip switches 38 and 40 are positioned horizontally near the top edge of sides 18 of the automatic vehicle 12. The switches 38 and 40 extend substantially the length of the side 18 of the vehicle 12 for easy access. As seen more clearly in FIG. 2, strip switch 38 protrudes from the plane of the side 18 of the delivery vehicle 12. This protrusion allows a person to easily hit or press the front portion of the plastic sleeve 34 of the strip switch 38 and is used to stop the vehicle. The stop strip switch preferably is red in color to enable quick detection of the switch and quickly convey the meaning of its signal as "stop."

The length and position of the strip switch 38 allows easy and quick access to a means to stop the automatic vehicle. In case the stop strip switch 38 cannot be employed in time, the vehicle 12 has a front bumper 30 with a pressure sensitive switch that stops the vehicle 12 when it hits an obstacle in its path. The combination of a manual strip switch and a pressure sensitive bumper on an automatic vehicle allows the vehicle to be stopped by other means than the programmed permanent and temporary stop signals, making the automatic vehicle 12 safer and more versatile.

In contrast to the protrusion of strip switch 38, the strip switch 40 is recessed within the plane of the sides 18 of the delivery cart 12. The cover of switch 40 is green in color to denote the starting purpose of the switch. The recessed position of switch 40 helps prevent any accidental contact with the start strip switch 40, when contact with switch 38 is intended. In order to hit the strip switch 40, a person must take deliberate action to press on the recessed front portion of the plastic sleeve of the start strip switch 40.

The stop switch 38 and the restart switch 40 are connected to an automatic program of the vehicle. The automatic program is shown schematically in FIG. 3. The automatic control 42 has a start signal input 44, a steering control signal input 46, a permanent stop signal input 48, and a temporary stop signal input 50. The automatic control 42 is connected to the motor control 60 by a go signal lead 64. Also connecting the motor control 60 to the automatic control 42 is a stop signal lead 66. In turn, the motor control 60 is directly connected to and controls the drive motor 62. The automatic control 42 is connected to the servo control circuit 52 through two leads 56 and 58. Lead 56 carries a servo enable signal 56 to the servo control circuit 52 and the other lead 58 carries a steering control signal. The automatic control 42 is programmed to respond to signals produced by a start signal lead 44, the steering control signal 46, the permanent stop signal lead 48 and the temporary stop signal lead 50. When the start signal is activated, for example by a switch, the auto control 42 is activated and in turn activates the go signal 64 to the motor control 60 that starts the drive motor 62. In addition, the automatic control 42 applies a signal via the servo enable signal lead 56 to the servo control circuit 52 that activates the servomotor 54 which steers the vehicle 12. As the vehicle moves along its predetermined path, the automatic control 42 responds to the steering control signals applied by lead 46 (from sensors which detect the guide line) and in turn applies a steering signal via lead 58 to the servo control circuits 52 to steer the vehicle. A temporary stop signal produced on lead 50 (from detected markers) will cause the automatic control 42 to apply a stop signal or the motor control 60 through lead 66. After a certain elapsed time, programmed into the automatic control, the automatic control 42 will apply a go signal via lead 64 to the motor control 60. In this manner, a temporary arrest of the movement of the automatic vehicle 12 is achieved. A permanent stop signal on lead 48 will cause the automatic control 42 to apply a stop signal through the lead 66 to the motor control 60 so that the motor 62 stops and power to the vehicle 12 is cut off. To reactivate the vehicle a start signal must be produced on input 44.

The stop switch 38 and the start switch 40 are also connected to the automatic control 42. When the stop switch 38 is pressed, a ground signal is applied to the automatic control 42. Responsive thereto, the automatic control circuit applies a stop signal through lead 66 to the motor control 60. The signal from switch 38, however, overrides any programmed start or any other signal that would result in a go signal through lead 64 to the motor control 60. When the automatic vehicle 12 is temporarily stopped, the actuation of the stop switch 38 will effectively block any programmed signal that would effectuate a go signal on lead 64 to the motor control 60.

The restart switch 40, when closed, will reactivate the automatic control 42 to produce a go signal through lead 64 to the motor control 60. The go switch signal from switch 40 will also override any temporary stop signal produced by input 50 that is being timed by the auto control 42, consequently, immediately restarting the vehicle 12 along the path. The go switch 40 is dependent on the vehicle's power being on, therefore, when the permanent stop signal from input 48 is activated, activation of the go switch 40 will not restart the vehicle. Power to the vehicle may only be turned on through a start signal from input 44.

Reference is now made to FIGS. 2 and 4. Each strip switch 38 and 40 has a plastic sleeve 34 and 36 which are secured together at the longitudinal edges thereof. A thin strip of copper sheeting 70 is attached to the back inside portion of the plastic sleeve 34. A second strip of copper sheeting 68 is formed into a square wave pattern with a slight arch outward congruent with the outward arch of the front portion of the plastic sleeve. Two thin strips of Mylar 72 separate the edges of the two copper strips 68 and 70. When the front portion of the plastic sleeve is pressed inwardly, the arch is inversely flexed and the two copper strips make contact with each other, thereby closing a circuit to which the switch strip is connected. The closing of the circuit activates the appropriate signal in the auto control 42.

It should be understood that the foregoing embodiment of the present invention is merely illustrative of the preferred practice of the present invention and that various changes and modifications can be made in the arrangements and details of construction of the embodiments described herein without departing from the spirit and scope of the invention.

The embodiments of the invention in which an exclusive property or privilege is claimed are defined as follows:

1. In a vehicle having a front end, back end and opposite sides, and which is driven in a back to front direction automatically along a preselected path, and which includes first switch means for arresting the movement of the vehicle along the path and a second switch means for restarting the vehicle along the path, the improvement which comprises:

said first switch means comprising a manually operable elongated switch element extending substantially the length of a side of the vehicle, said switch element having contacts which close said first switch means when pressure is applied to any portion of said switch element; the elongated switch element extending substantially horizontally along a top portion of the side of the vehicle; said elongated element protrudes from a plane of the side of the vehicle; and the second switch means comprising a second manually operable elongated switch element which closes when manual pressure is applied thereto at any point along its length, the second elongated switch being positioned alongside the first switch element means elongated switch element and extending substantially the length of a side of the vehicle.

2. A vehicle as described in claim 1 wherein:
the elongated switch elements comprise:
   a flexible plastic sleeve with a flat back portion and an arched front portion;
   a first thin copper strip positioned at the back portion of the plastic sleeve; and
   a second thin elongated copper strip formed in an undulated configuration and having a longitudinal arch in the center thereof, the second elongated strip being aligned with the first elongated strip and positioned adjacent the front portion of the plastic sleeve whereby pressure on the front portion of the sleeve will cause the sleeve front portion and second copper strip to flex inwardly making the two copper strips come in contact with each other.

3. A vehicle as described in claim 2 wherein said first elongated switch element has a red outer surface coloring to enable easy and quick detection as to the arresting purpose of said first switch means; and
wherein said second elongated switch element has a green outer surface coloring to enable easy and quick detection as to the starting purpose of said second switch means.

4. A vehicle as described in claim 1 wherein said first elongated switch element has a red outer surface coloring to enable easy and quick detection as to the arresting function of said first switch means.

5. A vehicle as described in claim 1 wherein said first elongated switch element has a red outer surface coloring to enable easy and quick detection as to the arresting function of said first switch means.

6. A vehicle as described in claim 1 wherein the second switch element is recessed with respect to the first switch means elongated switch element so that accidental striking of the second switch element for the first switch element is minimized.

7. In a vehicle having a front end, back end and opposite sides, and which is driven in a back to front direction automatically along a preselected path, and which includes first switch means for arresting the movement of the vehicle along the path and a second switch means for restarting the vehicle along the path, the improvement which comprises:

said first switch means comprising a manually operable elongated switch element extending substantially the length of a side of the vehicle, said switch element having contacts which close said first switch means when pressure is applied to any portion of said switch element;
the second switch means comprising a second manually operable elongated switch element which closes when manual pressure is applied thereto at any point along its length, the second elongated switch element being positioned alongside the first switch means elongated switch element and extending substantially the length of a side of the vehicle and recessed with respect to the first switch means elongated switch element so that accidental striking of the second switch element for the first switch element is minimized.

* * * * *